2 Sheets—Sheet 1.

A. L. IDE.

STEAM RADIATOR.

No. 6,810.

Reissued Dec. 21, 1875.

WITNESSES:
Jas E. Hutchinson
John R. Young

INVENTOR:
A. L. Ide, by
Prindle and Lay his Attys

N. PETERS, PHOTO-LITHOGRAPHER, WASHINGTON, D. C.

A. L. IDE.

STEAM RADIATOR.

No. 6,810.

Reissued Dec. 21, 1875.

WITNESSES:

Jas. H. Hutchinson

John R. Young

INVENTOR.

A. L. Ide, by

Prindle and Lay his Attys

N. PETERS, PHOTO-LITHOGRAPHER, WASHINGTON, D. C.

UNITED STATES PATENT OFFICE.

ALBERT L. IDE, OF SPRINGFIELD, ILLINOIS.

IMPROVEMENT IN STEAM-RADIATORS.

Specification forming part of Letters Patent No. 144,981, dated November 25, 1873; reissue No. 6,810, dated December 21, 1875; application filed December 2, 1875.

*To all whom it may concern:*

Be it known that I, ALBERT L. IDE, of Springfield, Sangamon county, State of Illinois, did invent certain new and useful Improvements in Steam-Radiators, for which Letters Patent No. 144,981 were issued to me upon the 25th day of November, 1873, which Letters Patent have been found defective, in that the specification and claims do not cover and embrace all of the original invention, as set forth in the application filed in the Patent Office on the 6th day of June, 1873.

Now, therefore, being desirous of reissuing said Letters Patent, (herewith surrendered,) I have prepared, and do hereby declare that the following is a full, clear, and exact description of the said invention, reference being had to the accompanying drawings, making a part of this specification, in which—

Figure 1:
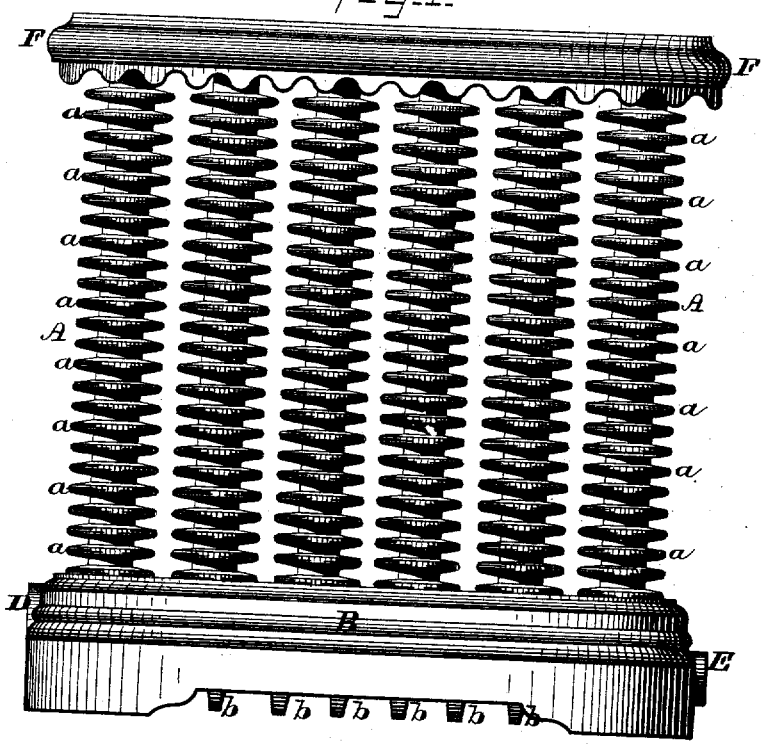
Figure 2:
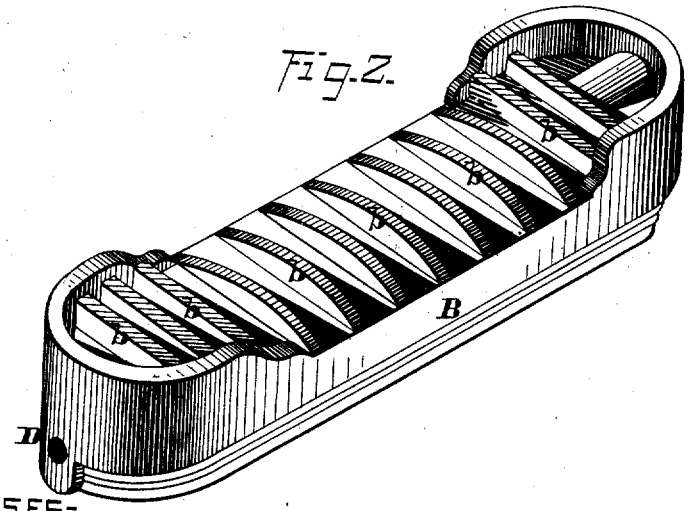
Figure 3:
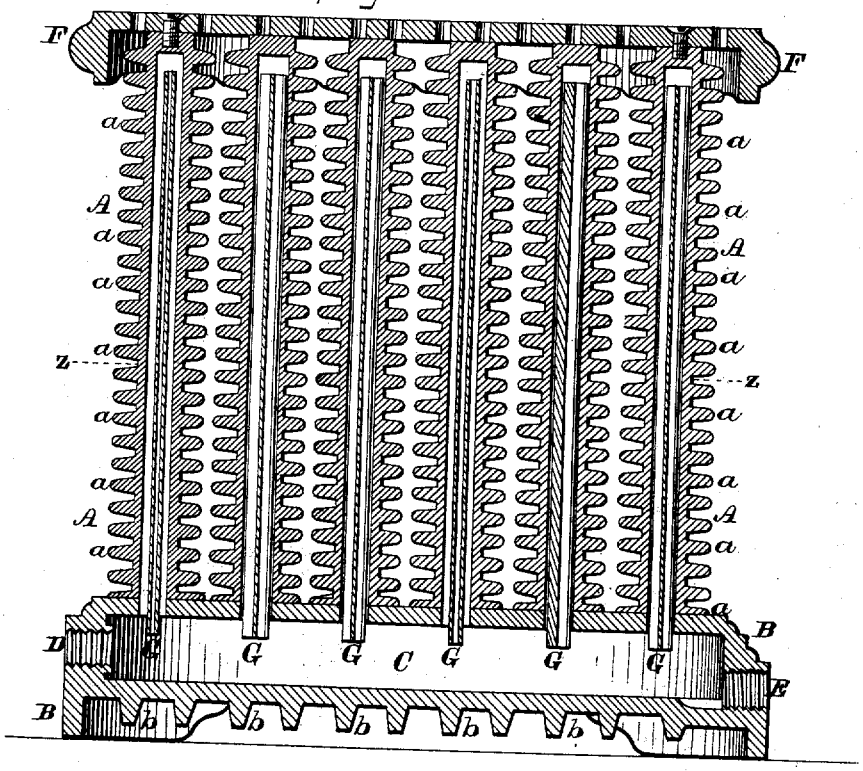
Figure 4:
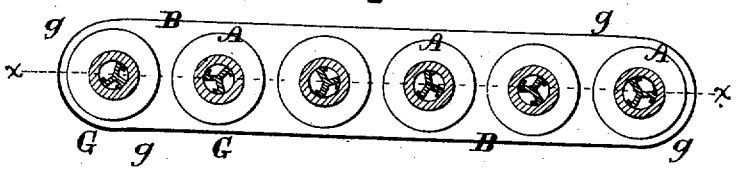

Figure 1 is a side elevation of my improved apparatus. Fig. 2 is a perspective view of the lower side of the base. Fig. 3 is a vertical central section upon line *x x* of Fig. 4; and Fig. 4 is a horizontal section upon line *z z* of Fig. 3.

Letters of like name and kind refer to like parts in each of the figures.

The object of my invention is to render more speedy and thorough the expulsion of air from the pipes of a radiator, and to increase its heating capacity at the base; and it consists in a vertical radiator pipe or column, constructed of cast or wrought metal, and divided interiorly into three vertical passages, substantially as and for the purpose hereinafter specified.

In the annexed drawings, A and A represent a series of pipes inclosed at their upper ends, open at their lower ends, and secured vertically upon and within a base, B, which, as seen in Fig. 3, is provided with an interior space, C, that communicates at its ends, by means of an inlet and an outlet passage, D and E, respectively, with steam-supply and waste pipes. Exteriorly each of the vertical pipes A is provided with a series of concentric flanges, which, transversely, have a Λ shape, and, by nearly trebling the exposed surface of said pipe, correspondingly increases its capacity for radiating heat. An ornamental cap, F, secured upon and covering the upper ends of the pipes A, insures their relative positions, and gives a finish to the upper portion of the radiator. Extending upward from the lower end of each pipe A to a point near the upper end of the same, is a three-flanged partition, G, which has the form shown in Fig. 4, and divides the space within said pipe into three substantially equal vertical passages, *g*, that at their lower ends open into the space C within the base B, and, at their upper ends, into the undivided portion of the interior of said pipe.

As thus constructed, upon the admission of steam to the radiator said steam will pass upward through two of the passages *g* of each pipe, while the air contained within said pipe will be forced downward, through the third passage, into the space C, and expelled from the latter.

It has been demonstrated by experiment that upon the admission of steam to the pipes the effect of the condensation of the same is to render requisite an amount equal to at least twice the volume of the outward-flowing current of air; and that, therefore, by dividing the space as shown, the necessary proportion of steam is admitted to the pipes to expel the air with the greatest possible dispatch; and, further, that the steam invariably ascends two passages, while air descends a third.

These radiator-pipes not only heat with greater rapidity than those having the interior space divided into two passages, but they also maintain a higher temperature, as, in consequence of the constantly-decreasing volume of the steam from the moment when it enters the radiator until it passes into the waste-pipe, its upward and downward course requires the same relative proportion of passages in order to insure a uniform circulation.

Great difficulty has been experienced in securing a sufficient radiation of heat from the base of steam-heaters to render them desirable for many rooms, and, in consequence, their use has been more restricted than would otherwise have been the case.

To remedy this difficulty I elevate the base B, so as to leave a considerable air-space beneath, and upon its lower side provide a series of projections or ribs, *b*, which have, preferably, a Λ shape, and are placed with their points downward. As thus constructed, it is found that a large increase is effected in the downward radiation of heat, and that the device is rendered applicable in any place where other heating apparatus is employed.

While the vertical pipes A and A are preferably constructed from cast metal, it will be seen that the principle involved and the operation will be the same should wrought metal be used.

Having thus fully set forth the nature and merits of my invention, what I claim as new is—

In a steam-radiator, a vertical pipe or column, constructed of cast or wrought metal, and divided interiorly into three vertical passages, substantially as and for the purpose specified.

In testimony whereof I hereunto set my hand this 12th day of November, 1875.

ALBERT L. IDE.

Witnesses:
E. R. ULRICK,
EDWIN A. WILSON.